May 25, 1954  J. H. HARRIS  2,679,099
CUTTING DEVICE FOR INSPECTING ROASTING EARS AND THE LIKE
Filed June 20, 1952
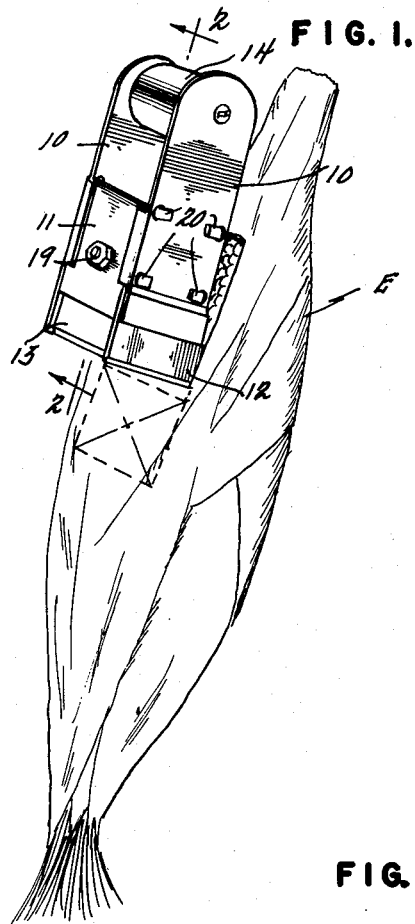
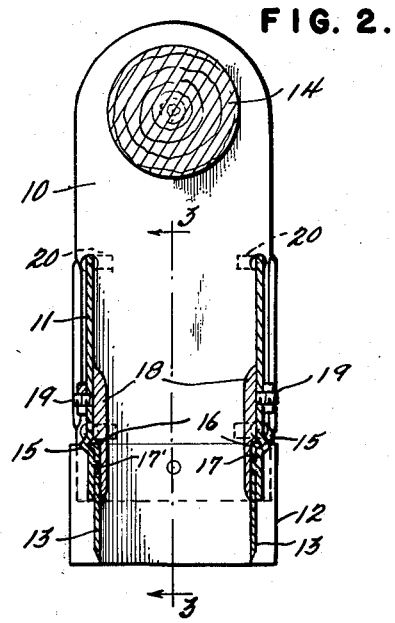
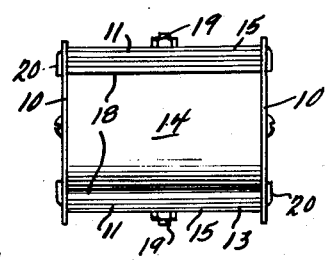
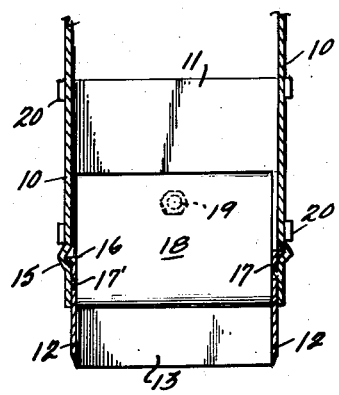
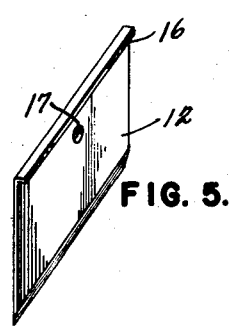
INVENTOR
JOHN H. HARRIS
BY *Adams & Bush*
ATTORNEYS Patented May 25, 1954

2,679,099

UNITED STATES PATENT OFFICE 2,679,099

CUTTING DEVICE FOR INSPECTING ROASTING EARS AND THE LIKE

John H. Harris, Marietta, Ga.

Application June 20, 1952, Serial No. 294,603

3 Claims. (Cl. 30—305)

This invention relates to a cutting tool especially designed for use in cutting a small opening in the shucks of roasting ears and the like for inspection of the grains.

Among other objects, the invention aims to provide a simplified cutting tool of the character described, especially designed for cutting small openings in the shucks of roasting ears to permit inspection of the grains without exposing a large portion of the ears to evaporation after an inspection is made.

A further object of the invention is to provide a cutting tool of the character described, adapted to be manufactured very economically and which is rugged in construction and can be used repeatedly for inspecting roasting ears and the like.

A further object of the invention is to provide a box-like cutting tool of the character described, which is designed to cut generally rectangular openings through the shucks of roasting ears, so that the cut shucks can be peeled away from the grains to permit easy inspection of the grains by prospective customers.

Other objects and advantages of the invention will appear in the specification, taken in connection with the accompanying drawings, wherein:

Fig. 1 is a perspective view of the preferred form of cutting device, showing it being applied to a roasting ear;

Fig. 2 is a vertical sectional view taken on the line 2—2 of Fig. 1;

Fig. 3 is a sectional view taken on the line 3—3 of Fig. 2;

Fig. 4 is a bottom plan view of the cutting device; and

Fig. 5 is a perspective view of one of the cutting blades shown in Fig. 1.

Referring more particularly to the illustrated embodiment of the invention, the cutting tool is shown as being box-shaped, having cutting knives or blades adapted to cut a rectangular opening through the shucks of roasting ears to permit ready inspection of the grains by prospective customers. The idea is to provide a simplified cutting tool of this type which will cut a very small opening through the shuck of a roasting ear intermediate its ends, so that the cut-away shuck portion can be pulled away from the grains of the ear by hinging action.

In the illustrated example, the cutter is shown as comprising a pair of opposed frame members 10 and side frame members 11 arranged in box-like formation and carrying cutting blades 12 and 13, respectively, arranged in generally rectangular formation, so that the tool can be used to cut rectangular openings through the shuck of a roasting ear E, as clearly shown in Fig. 1.

While the assemblage of frame members and blades may be made in several ways, the members 10 are shown as being made of sheet metal and extended upwardly, as shown in Fig. 1, with a cylindrical handle member 14 conveniently secured between them by screws, as shown. The lower portions of the sheet metal frame members 10 are shown as having transverse channels 15 to receive flanges 16 formed on the upper ends of the blades 12, which may be made of hardened steel or other suitable material. The blade flanges are shown as being seated in the channels and each blade is shown as having an opening 17 which receives a stud 17' formed integral with the respective channels 15. Thus, the blades may be removed and replaced. Moreover one of the end blades may be removed to facilitate cutting of a U-shaped slit in the shuck with the tool held at right angles to the ear.

The frame members 11 are shown as terminating short of the frame members 10 to provide shuck openings between them and the handle 14 on opposite sides of the tool. These frame members are likewise shown as having transverse channels 15 to receive angular flanges 16 on the upper edges of the blades 13, like the flanges on the other pair of blades. The two blades 13 are arranged between the opposed blades 12, as shown in Figs. 1 and 4, and the blades 12 project beyond the opposite ends of the blades 13 and can be employed to cut longitudinal slits in the shuck of a roasting ear as the tool is pushed into the ear to expose the grains. The blades 13 are shown as being held in place on the side frame members 11 by means of thin clamping plates 18 overlapping the upper end portions of the blades and engaging the inner surfaces of the frame members above the blades. These clamping members are shown as having integral screw threaded extensions projecting through openings in the side frame members so that they can be clamped against the side frame members in clamping relation to the blades by means of nuts 19 engaging the outer faces of the frame members. The upper and lower ends of the clamping plates are bevelled to prevent them from engaging severed shucks as the tool is being manipulated.

The box-like frame members may be secured in assembled form by means of bolts, rivets, or the like. In the present example, the frame members 11 are shown as having pairs of spaced, integral tangs or fingers 20 projecting through openings in the frame members 10 and bent inwardly toward each other, as shown in Fig. 1.

The sharpened edges of the blades 12 and 13 are shown as being arranged in the same transverse plane and the construction and arrangement is such that the tool can be grasped by the fingers of one hand and pushed longitudinally along the shuck of an ear of corn, after an end blade cuts through it to the grains, as shown in Fig. 1.

From the foregoing description, it will be seen that the tool can be made very economically of sheet metal and that it is very rugged and efficient in operation. It is designed to cut small, rectangular inspection openings in ears of corn, so that the cut away and slitted shuck portions can be bent into open position and again returned to their grain covering position without exposing the grains to evaporation after inspection.

Obviously, the invention is not restricted to the particular embodiment thereof herein shown and described.

What is claimed is:

1. A cutting tool for sampling roasting ears and the like comprising a box-shaped blade holder composed of four generally rectangular, vertical, sheet metal wall members secured together at their edges, with two opposed wall members projecting above the upper edges of the other wall members; a handle secured to the upper end portions of the upwardly projecting wall members; and sheet metal blades secured to and extending beyond the lower end portions of the wall members in contact with their inner faces, whereby the blades will sever a rectangular inspection opening through the shucks of a roasting ear and permit the severed shucks to pass upwardly through the holder below said handle.

2. A cutting tool for sampling roasting ears and the like, as set forth in claim 1, wherein the blades are generally rectangular and the side edges of one pair of the blades overlap the side edges of the other pair of blades, whereby the cutting edges of the overlapping blades will cut parallel slits in the shuck as the tool is pushed longitudinally of a roasting ear.

3. A cutting tool for sampling roasting ears and the like, as set forth in claim 1, wherein the blades are removably secured to the wall members and the space between the wall members above the blades is sufficiently large to permit severed shucks to pass therethrough to be discharged from the holder below the handle.

References Cited in the file of this patent

UNITED STATES PATENTS

| Number | Name | Date |
|---|---|---|
| 989,162 | Larrick | Apr. 11, 1911 |
| 1,636,583 | Ahl | July 19, 1927 |
| 1,665,064 | Magrath | Apr. 3, 1928 |
| 2,586,823 | Huhn | Feb. 26, 1952 |